United States Patent
Persson et al.

(10) Patent No.: US 8,768,845 B1
(45) Date of Patent: Jul. 1, 2014

(54) ELECTRONIC WALLET REMOVAL FROM MOBILE ELECTRONIC DEVICES

(75) Inventors: Sarah A. V. Persson, Olathe, KS (US);
Kevin Zhu, Overland Park, KS (US);
Lei Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 194 days.

(21) Appl. No.: 12/371,901

(22) Filed: Feb. 16, 2009

(51) Int. Cl.
*G06F 21/10* (2013.01)

(52) U.S. Cl.
USPC ............... 705/51; 455/410; 455/411; 705/64; 705/67; 235/379; 235/380

(58) Field of Classification Search
USPC ........ 705/64, 67; 235/379, 380; 455/410, 411
See application file for complete search history.

(56) References Cited

U.S. PATENT DOCUMENTS

| | | | |
|---|---|---|---|
| 5,276,311 A | | 1/1994 | Hennige |
| 5,310,999 A | | 5/1994 | Claus et al. |
| 5,335,278 A | * | 8/1994 | Matchett et al. ............. 380/248 |
| 5,453,601 A | * | 9/1995 | Rosen ............................. 705/65 |
| 5,496,966 A | | 3/1996 | Hightower et al. |
| 5,530,702 A | | 6/1996 | Palmer et al. |
| 5,590,038 A | | 12/1996 | Pitroda |
| 5,604,801 A | * | 2/1997 | Dolan et al. .................. 713/159 |
| 5,734,977 A | * | 3/1998 | Sanmugam .................... 455/410 |
| 5,887,251 A | * | 3/1999 | Fehnel .......................... 455/411 |
| 5,978,669 A | * | 11/1999 | Sanmugam .................... 455/410 |
| 5,989,720 A | | 11/1999 | Taniyama |
| 6,000,608 A | | 12/1999 | Dorf |
| 6,012,634 A | | 1/2000 | Brogan et al. |
| 6,038,440 A | * | 3/2000 | Wu ............................... 455/410 |
| 6,085,084 A | * | 7/2000 | Christmas .................... 455/411 |
| 6,122,625 A | * | 9/2000 | Rosen ............................ 705/65 |
| 6,199,161 B1 | | 3/2001 | Ahvenainen |
| 6,290,127 B1 | | 9/2001 | Schilling |
| 6,298,442 B1 | | 10/2001 | Kocher et al. |
| 6,360,954 B1 | | 3/2002 | Barnardo |
| 6,405,181 B2 | | 6/2002 | Lent et al. |
| 6,446,049 B1 | | 9/2002 | Janning et al. |

(Continued)

FOREIGN PATENT DOCUMENTS

WO  WO2004105421 A2  12/2004

OTHER PUBLICATIONS

BlackBerry Enterprise Server for Microsoft Exchange, Version 4.0—Handheld Management Guide. Last modified Aug. 18, 2006. Available at <http://docs.blackberry.com/en/admin/deliverables/1655/Handheld_Management_Guide.pdf>.*

(Continued)

*Primary Examiner* — Mamon Obeid (57) ABSTRACT

A system for removing an electronic wallet application from a mobile electronic device is provided. The system comprises a first server executing an authentication, authorization, and accounting application and a second server executing a trusted service manager application. The first server grants data network access to the mobile electronic device when a special pass has been provisioned to the first server, wherein the special pass is associated with the mobile electronic device. The second server sends the special pass associated with the mobile electronic device to the first server in response to a triggering event, establishes a data communication session with the mobile electronic device, and sends instructions to the mobile electronic device to remove the electronic wallet application from the mobile electronic device, wherein the establishment of the data communication session is mediated by the authentication, authorization, and accounting application.

9 Claims, 6 Drawing Sheets

(56) References Cited

U.S. PATENT DOCUMENTS

| | | | |
|---|---|---|---|
| 6,466,777 B1 | 10/2002 | Urita | |
| 6,584,326 B1 | 6/2003 | Boydston et al. | |
| 6,591,098 B1 | 7/2003 | Shieh et al. | |
| 6,606,491 B1* | 8/2003 | Peck | 455/411 |
| 6,631,849 B2 | 10/2003 | Blossom | |
| 6,655,587 B2* | 12/2003 | Andrews et al. | 235/383 |
| 6,679,423 B2* | 1/2004 | Ijichi et al. | 235/380 |
| 6,705,521 B1 | 3/2004 | Wu et al. | |
| 6,755,342 B1 | 6/2004 | Jordan, Jr. | |
| 6,810,521 B1* | 10/2004 | Gelgon et al. | 719/313 |
| 6,817,521 B1 | 11/2004 | Matada | |
| 6,879,965 B2 | 4/2005 | Fung et al. | |
| 6,880,085 B1 | 4/2005 | Balczewski et al. | |
| 6,938,821 B2 | 9/2005 | Gangi | |
| 7,146,159 B1 | 12/2006 | Zhu | |
| 7,194,438 B2* | 3/2007 | Sovio et al. | 705/50 |
| 7,233,785 B2* | 6/2007 | Yamagishi et al. | 455/411 |
| 7,269,256 B2* | 9/2007 | Rosen | 380/44 |
| 7,275,095 B1* | 9/2007 | Lebouill | 709/223 |
| 7,413,113 B1 | 8/2008 | Zhu | |
| 7,434,723 B1 | 10/2008 | White et al. | |
| 7,475,044 B1* | 1/2009 | Kawai et al. | 705/65 |
| 7,494,067 B1 | 2/2009 | Zhu | |
| 7,533,063 B2* | 5/2009 | Kianian | 705/64 |
| 7,546,956 B2* | 6/2009 | Adams et al. | 235/472.01 |
| 7,567,795 B1 | 7/2009 | Champion et al. | |
| 7,644,039 B1 | 1/2010 | Magee et al. | |
| 7,644,859 B1 | 1/2010 | Zhu | |
| 7,676,432 B2 | 3/2010 | Ling | |
| 7,707,113 B1 | 4/2010 | DiMartino et al. | |
| 7,748,636 B2 | 7/2010 | Finn | |
| 7,819,307 B2* | 10/2010 | Lyons et al. | 235/379 |
| 7,822,688 B2 | 10/2010 | Labrou et al. | |
| 7,926,713 B2* | 4/2011 | Yamada et al. | 235/380 |
| 7,926,714 B1 | 4/2011 | Zhu | |
| 7,974,926 B2* | 7/2011 | Ohmori et al. | 705/52 |
| 8,055,184 B1* | 11/2011 | DiMartino et al. | 455/1 |
| 8,060,449 B1* | 11/2011 | Zhu | 705/75 |
| 8,083,140 B1* | 12/2011 | Katzer et al. | 235/383 |
| 8,107,953 B2 | 1/2012 | Zimmerman et al. | |
| 8,123,128 B1 | 2/2012 | Zhu | |
| 8,126,806 B1* | 2/2012 | DiMartino et al. | 705/41 |
| 8,165,961 B1 | 4/2012 | DiMartino et al. | |
| 8,200,582 B1 | 6/2012 | Zhu | |
| 8,244,169 B1* | 8/2012 | DiMartino et al. | 455/1 |
| 8,249,935 B1* | 8/2012 | DiMartino et al. | 705/16 |
| 8,250,662 B1 | 8/2012 | Zhu | |
| 8,290,433 B2* | 10/2012 | Fisher et al. | 455/41.1 |
| 8,332,272 B2* | 12/2012 | Fisher | 705/16 |
| 8,352,323 B2* | 1/2013 | Fisher | 705/16 |
| 8,468,095 B1* | 6/2013 | DiMartino et al. | 705/41 |
| 8,655,310 B1 | 2/2014 | Katzer et al. | |
| 2001/0005184 A1 | 6/2001 | Tsuno et al. | |
| 2001/0013551 A1 | 8/2001 | Ramachandran | |
| 2002/0006806 A1 | 1/2002 | Kinnunen et al. | |
| 2002/0011519 A1 | 1/2002 | Shults, III | |
| 2002/0016838 A1* | 2/2002 | Geluc et al. | 709/224 |
| 2002/0018016 A1 | 2/2002 | Radonic | |
| 2002/0052193 A1 | 5/2002 | Chetty | |
| 2002/0052754 A1 | 5/2002 | Joyce et al. | |
| 2002/0062284 A1 | 5/2002 | Kawan | |
| 2002/0088852 A1 | 7/2002 | Ohta et al. | |
| 2002/0123971 A1 | 9/2002 | Maritzen et al. | |
| 2002/0128982 A1 | 9/2002 | Gefwert et al. | |
| 2002/0136199 A1 | 9/2002 | Hartmaier | |
| 2002/0147913 A1 | 10/2002 | Lun Yip | |
| 2002/0188575 A1 | 12/2002 | Freeny, Jr. | |
| 2002/0195487 A1 | 12/2002 | Hosogoe | |
| 2003/0009382 A1 | 1/2003 | D'Arbeloff et al. | |
| 2003/0028481 A1 | 2/2003 | Flitcroft et al. | |
| 2003/0032409 A1 | 2/2003 | Hutcheson et al. | |
| 2003/0045328 A1 | 3/2003 | Natsuno | |
| 2003/0070080 A1* | 4/2003 | Rosen | 713/187 |
| 2003/0083933 A1 | 5/2003 | McAlear | |
| 2003/0125054 A1 | 7/2003 | Garcia | |
| 2003/0149900 A1 | 8/2003 | Glassman et al. | |
| 2003/0161503 A1 | 8/2003 | Kramer | |
| 2003/0211862 A1 | 11/2003 | Hutchison, IV et al. | |
| 2003/0220876 A1 | 11/2003 | Burger et al. | |
| 2003/0233320 A1 | 12/2003 | Connor, Jr. | |
| 2004/0044622 A1 | 3/2004 | Blott et al. | |
| 2004/0093265 A1 | 5/2004 | Ramchandani et al. | |
| 2004/0122685 A1 | 6/2004 | Bunce | |
| 2004/0122771 A1 | 6/2004 | Celi, Jr. et al. | |
| 2004/0139024 A1 | 7/2004 | So | |
| 2004/0159700 A1 | 8/2004 | Khan et al. | |
| 2004/0166839 A1 | 8/2004 | Okkonen et al. | |
| 2004/0192303 A1 | 9/2004 | Puthenkulam | |
| 2004/0198333 A1 | 10/2004 | Zanaty | |
| 2004/0203601 A1 | 10/2004 | Morriss et al. | |
| 2004/0204021 A1* | 10/2004 | Cocita | 455/550.1 |
| 2004/0204070 A1 | 10/2004 | August et al. | |
| 2005/0186989 A1* | 8/2005 | Cocita | 455/558 |
| 2005/0216424 A1 | 9/2005 | Gandre et al. | |
| 2005/0234778 A1 | 10/2005 | Sperduti et al. | |
| 2005/0250522 A1* | 11/2005 | Gilbert et al. | 455/466 |
| 2005/0278192 A1 | 12/2005 | Cantini et al. | |
| 2006/0073808 A1 | 4/2006 | Buchert | |
| 2006/0085847 A1 | 4/2006 | Ikeuchi et al. | |
| 2006/0136334 A1 | 6/2006 | Atkinson et al. | |
| 2006/0164318 A1 | 7/2006 | Lastinger et al. | |
| 2006/0165060 A1* | 7/2006 | Dua | 370/352 |
| 2006/0167823 A1 | 7/2006 | York et al. | |
| 2006/0191995 A1 | 8/2006 | Stewart et al. | |
| 2006/0191408 A1 | 9/2006 | Yamagishi et al. | 455/411 |
| 2007/0010213 A1 | 1/2007 | Dewan | |
| 2007/0011461 A1 | 1/2007 | Jeng | |
| 2007/0080215 A1 | 4/2007 | Ramachandran et al. | |
| 2007/0095892 A1* | 5/2007 | Lyons et al. | 235/379 |
| 2007/0125840 A1 | 6/2007 | Law et al. | |
| 2007/0145152 A1 | 6/2007 | Jogand-Coulomb et al. | |
| 2007/0197261 A1 | 8/2007 | Humbel | |
| 2007/0198410 A1 | 8/2007 | Labgold et al. | |
| 2007/0223685 A1 | 9/2007 | Boubion et al. | |
| 2007/0233615 A1 | 10/2007 | Tumminaro | |
| 2007/0234427 A1* | 10/2007 | Gardner et al. | 726/23 |
| 2007/0244811 A1 | 10/2007 | Tumminaro | |
| 2007/0248232 A1 | 10/2007 | Driscoll et al. | |
| 2007/0255620 A1 | 11/2007 | Tumminaro et al. | |
| 2007/0255652 A1 | 11/2007 | Tumminaro et al. | |
| 2007/0278290 A1 | 12/2007 | Messerges et al. | |
| 2007/0278291 A1 | 12/2007 | Rans et al. | |
| 2007/0281664 A1* | 12/2007 | Kaneko et al. | 455/410 |
| 2007/0291995 A1 | 12/2007 | Rivera | |
| 2008/0059379 A1* | 3/2008 | Ramaci et al. | 705/66 |
| 2008/0067240 A1* | 3/2008 | Nakano et al. | 235/380 |
| 2008/0078831 A1 | 4/2008 | Johnson et al. | |
| 2008/0116264 A1 | 5/2008 | Hammad et al. | |
| 2008/0121687 A1 | 5/2008 | Buhot | |
| 2008/0126260 A1 | 5/2008 | Cox et al. | |
| 2008/0201212 A1* | 8/2008 | Hammad et al. | 705/13 |
| 2008/0208681 A1 | 8/2008 | Hammad et al. | |
| 2008/0238610 A1 | 10/2008 | Rosenberg | |
| 2008/0297306 A1 | 12/2008 | Huajun et al. | |
| 2008/0315989 A1 | 12/2008 | Mirkazemi-Moud et al. | |
| 2009/0018964 A1 | 1/2009 | Liu et al. | |
| 2009/0046858 A1 | 2/2009 | Iyer et al. | |
| 2009/0050689 A1* | 2/2009 | Sako et al. | 235/375 |
| 2009/0078761 A1 | 3/2009 | Sines | |
| 2009/0093272 A1 | 4/2009 | Saarisalo et al. | |
| 2009/0097531 A1 | 4/2009 | Franceschini et al. | |
| 2009/0098825 A1 | 4/2009 | Huomo et al. | |
| 2009/0112765 A1 | 4/2009 | Skowronek | |
| 2009/0143104 A1 | 6/2009 | Loh et al. | |
| 2009/0192937 A1 | 7/2009 | Griffin et al. | |
| 2009/0253409 A1 | 10/2009 | Slavov et al. | |
| 2009/0270174 A1 | 10/2009 | Kelly et al. | |
| 2009/0313689 A1 | 12/2009 | Nyström et al. | |
| 2009/0327292 A1* | 12/2009 | Janssen et al. | 707/8 |
| 2010/0030651 A1 | 2/2010 | Matotek et al. | |
| 2010/0094752 A1 | 4/2010 | Heath | |
| 2010/0133337 A1* | 6/2010 | Van Rensburg | 235/380 |

(56) References Cited

U.S. PATENT DOCUMENTS

| | | | |
|---|---|---|---|
| 2011/0006112 A1 | 1/2011 | Mueller | |
| 2011/0053560 A1 | 3/2011 | Jain et al. | |
| 2011/0225655 A1* | 9/2011 | Niemel et al. | 726/24 |

OTHER PUBLICATIONS

BlackBerry Enterprise Server for Microsoft Exchange, Version 4.0—Administration Guide. Last modified Nov. 10, 2006. Available at <http://docs.blackberry.com/en/admin/deliverables/1637/Administration_Guide.pdf>.*
How Networks Work, Millennium Edition. Derfler, Frank and Les Freed. Que Publishing, 2000 ISBN 0-7897-2445-6. Front and back matter, chapters 1-27 provided.*
DiMartino, Allison, "Method for Launching an Electronic Wallet," filed Dec. 3, 2007, U.S. Appl. No. 11/949,759.
DiMartino, Allison, "Method and System for Blocking Confidential Information at a Point-of-Sale Reader from Eavesdropping," filed Sep. 27, 2007, U.S. Appl. No. 11/863,229.
DiMartino, Allison A., et al., Patent Application entitled, "System and Method for Active Jamming of Confidential Information Transmitted at a Point-of-Sale Reader," filed Jan. 30, 2008, U.S. Appl. No. 12/022,903.
Katzer, Robin D., et al., Patent Application entitled, "Control of Secure Elements through Point-of-Sale Device," filed Apr. 8, 2008, U.S. Appl. No. 12/099,771.
Zhu, Kevin, Patent Application entitled, "Mobil Device Password System," filed Jan. 5, 2009, U.S. Appl. No. 12/348,377.
Zhu, Kevin, Patent Application entitled, "Partially Delegated Over-the-Air Provisioning of a Secure Element," filed Jan. 5, 2009, U.S. Appl. No. 12/348,371.
Katzer, Robin Dale, Patent Application entitled, "System and Method of Over-the-Air Provisioning," filed Feb. 5, 2008, U.S. Appl. No. 12/026,224.
Zhu, Kevin, Patent Application entitled, "System and Method of Provisioning Confidential Information Via a Mobile Device," filed Oct. 20, 2008, U.S. Appl. No. 12/254,267.
Office Action dated Jun. 17, 2009, U.S. Appl. No. 11/949,759, filed Dec. 3, 2007.
Office Action dated Nov. 13, 2009, U.S. Appl. No. 11/949,759, filed Dec. 3, 2007.
Office Action dated May 25, 2010, U.S. Appl. No. 11/949,759, filed Dec. 3, 2007.
Final Office Action dated Sep. 10, 2010, U.S. Appl. No. 11/949,759, filed Dec. 3, 2007.
Office Action dated Feb. 15, 2011, U.S. Appl. No. 11/949,759, filed Dec. 3, 2007.
Office Action dated Feb. 17, 2009, U.S. Appl. No. 11/863,229, filed Sep. 27 2007.
Office Action dated Sep. 14, 2009, U.S. Appl. No. 11/863,229, filed Sep. 27, 2007.
Office Action dated Dec. 24, 2009, U.S. Appl. No. 11/863,229, filed Sep. 27, 2007.
Final Office Action dated Jun. 22, 2010, U.S. Appl. No. 11/863,229, filed Sep. 27, 2007.
Office Action dated Mar. 16, 2011, U.S. Appl. No. 11/863,229, filed Sep. 27, 2007.
Office Action dated Mar. 6, 2009, U.S. Appl. No. 11/863,632, filed Sep. 28 2007.
Office Action dated May 6, 2009, U.S. Appl. No. 11/863,632.
Notice of Allowance dated Dec. 1, 2009, U.S. Appl. No. 11/863,632.
Office Action dated Mar. 11, 2011, U.S. Appl. No. 12/022,903.
Office Action dated Mar. 1, 2011, U.S. Appl. No. 12/099,771.
Office Action dated Jan. 13, 2011, U.S. Appl. No. 12/348,377.
Office Action—Restriction dated Mar. 16, 2011, U.S. Appl. No. 12/348,371.
Office Action dated May 24, 2011, U.S. Appl. No. 12/348,371.
Office Action dated Nov. 8, 2010, U.S. Appl. No. 12/026,224.
Office Action dated May 12, 2010, U.S. Appl. No. 12/026,224.
Final Office Action dated Apr. 28, 2011, U.S. Appl. No. 12/026,224.
Office Action dated Oct. 5, 2010, U.S. Appl. No. 12/254,267.
Final Office Action dated Mar. 7, 2011, U.S. Appl. No. 12/254,267.
Office Action dated Oct. 3, 2005, U.S. Appl. No. 10/744,169.
Office Action dated Feb. 2, 2006, U.S. Appl. No. 10/744,169.
Final Office Action dated Jun. 8, 2006, U.S. Appl. No. 10/744,169.
Notice of Allowance dated Aug. 1, 2006, U.S. Appl. No. 10/744,169.
Final Office Action dated Aug. 22, 2011, U.S. Appl. No. 11/863,229, filed Sep. 27, 2007.
Supplemental Notice of Allowance dated Sep. 13, 2011, U.S. Appl. No. 12/022,903.
Advisory Action dated Aug. 30, 2011, U.S. Appl. No. 12/348,377.
Notice of Allowance dated Sep. 9, 2011, U.S. Appl. No. 12/348,371.
Notice of Allowance dated Sep. 6, 2011, U.S. Appl. No. 12/026,224.
Anonymous, "Sourcebook '96," Progressive Grocer Sourcebook '96 Supplement, Dec. 1995, pp. Cover-48, Maclean-Hunter Media Inc.
Dimartino, Allison A., et al., Patent Application entitled, "System and Method for Active Jamming of Confidential Information Transmitted at a Point-of-Sale Reader," filed Aug. 11, 2011, U.S. Appl. No. 13/207,645.
Final Office Action dated Aug. 5, 2011, U.S. Appl. No. 11/949,759, filed Dec. 3, 2007.
Notice of Allowance dated Jun. 21, 2011, U.S. Appl. No. 12/022,903.
Office Action dated Aug. 3, 2011, U.S. Appl. No. 12/099,771.
Final Office Action dated Jun. 20, 2011, U.S. Appl. No. 12/348,377.
Notice of Allowance dated Nov. 29, 2013, U.S. Appl. No. 12/254,267, filed Oct. 20, 2008.
Dimartino, Allison, "Method and System for Blocking Confidential Information at a Point-of-Sale Reader from Eavesdropping" filed Jun. 27, 2012, U.S. Appl. No. 13/535,337.
Notice of Allowance dated Feb. 11, 2013, U.S. Appl. No. 13/343,708, filed Jan. 4, 2012.
Office Action dated Feb. 11, 2013, U.S. Appl. No. 13/535,337, filed Jun. 27, 2012.
Final Office Action dated Feb. 26, 2013, U.S. Appl. No. 12/099,771.
Notice of Allowance dated Apr. 2, 2012, U.S. Appl. No. 13/207,645, filed Aug. 11, 2011.
Notice of Allowance dated Apr. 9, 2012, U.S. Appl. No. 13/270,205.
Baker, D., "Real-Time Provisioning of SIM cards: A Boon to GSM Operators", Apr. 13, 2011. http://www.billingworld.com/blogs/baker/2011104/real-time-provisioning-of-sim-cards-a-boon-to-gsm.aspx.
Notice of Allowance dated Apr. 9, 2012, U.S. Appl. No. 11/863,229, filed Sep. 27, 2007.
Final Office Action dated Jun. 3, 2013, U.S. Appl. No. 13/535,337, filed Jun. 27, 2012.
Advisory Action dated Jul. 30, 2013, U.S. Appl. No. 13/535,337, filed Jun. 27, 2012.
Restriction Requirement dated Aug. 6, 2012, U.S. Appl. No. 13/343,708, filed Jan. 4, 2012.
Notice of Allowance dated Oct. 2, 2013, U.S. Appl. No. 12/099,771.
Office Action dated Jun. 21, 2013, U.S. Appl. No. 12/254,267.
FAIPP Pre-Interview Communication dated Sep. 12, 2012, U.S. Appl. No. 13/343,708, filed Jan. 4, 2012.
FAIPP Office Action dated Nov. 15, 2012, U.S. Appl. No. 13/343,708, filed Jan. 4, 2012.
Office Action dated Aug. 21, 2012, U.S. Appl. No. 12/099,771.
DiMartino, Allison, Patent Application "Method and System for Setting Levels of Electronic Wallet Security," filed Feb. 8, 2010, U.S. Appl. No. 12/702,270.
Zhu, Kevin, Patent Application entitled, "Partially Delegated Over-the-Air Provisioning of a Secure Element," filed Oct. 10, 2011, U.S. Appl. No. 13/270,205.
Notice of Allowance dated Oct. 17, 2011, U.S. Appl. No. 11/949,759, filed Dec. 3, 2007.
Pre-Interview Communication dated Nov. 15, 2011, U.S. Appl. No. 13/207,645, filed Aug. 11, 2011.
Advisory Action dated Oct. 21, 2011, U.S. Appl. No. 11/863,229, filed Sep. 27, 2007.
Pre-Interview Communication dated Nov. 9, 2011, U.S. Appl. No. 12/702,270, filed Feb. 8, 2010.
Supplemental Notice of Allowance dated Oct. 6, 2011, U.S. Appl. No. 12/348,371.
Office Action dated Sep. 26, 2011, U.S. Appl. No. 12/254,267.

(56) References Cited

OTHER PUBLICATIONS

Supplemental Notice of Allowance dated Sep. 28, 2011, U.S. Appl. No. 12/022,903.
DiMartino, Allison, "Method for Launching an Electronic Wallet," filed Jan. 4, 2012, U.S. Appl. No. 131343,708.
Notice of Allowance dated Dec. 14, 2011, U.S. Appl. No. 12/702,270, filed Feb. 8, 2010.
Final Office Action dated Jan. 4, 2012, U.S. Appl. No. 12/099,771.
Notice of Allowance dated Jan. 5, 2012, U.S. Appl. No. 12/348,377.
FAIPP Pre-Interview Communication dated Feb. 21, 2012, U.S. Appl. No. 13/270,205.
Final Office Action dated Feb. 29, 2012, U.S. Appl. No. 12/254,267.
Notice of Allowance dated Dec. 19, 2013, U.S. Appl. No. 13/535,337, filed Jun. 27, 2012.

* cited by examiner

ELECTRONIC WALLET REMOVAL FROM MOBILE ELECTRONIC DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication services are typically provided by a common carrier operating company to subscribers on a payment basis. When a mobile electronic device seeks to establish a data communication link with another communication terminal, an authentication, authorization, and accounting (AAA) server in the network of the operating company may verify that the subject mobile electronic device has a current account and is authorized to initiate data communications links through the network of the operating company. The identity of the mobile electronic device may be provisioned into the authentication, authorization, and accounting server in connection with the initialization of a communication services account. The identity may comprise an electronic serial number (ESN) or other unique identifying information, e.g., media access control identification (MAC ID), associated with the mobile electronic device. The authentication, authorization, and accounting server may verify the subject mobile electronic device is authorized to initiate data communications links by comparing the electronic serial number or other identifying information provided by the mobile electronic device in an origination request message to a list of electronic serial numbers or other identification information accessible to the authentication, authorization, and accounting server, for example in a subscriber database. When a subscriber fails to pay the account bill timely or if the subscriber replaces their mobile electronic device with a different mobile electronic device, the mobile electronic device may be deprovisioned and/or removed from the list of electronic serial numbers or other identification information. If a subsequent data communication origination request message is received containing the deprovisioned electronic serial number or other identification information, the origination request may be rejected by the authentication, authorization, and accounting server.

SUMMARY

In an embodiment, a system for removing an electronic wallet application from a mobile electronic device is disclosed. The system comprises a first server executing an authentication, authorization, and accounting application and a second server executing a trusted service manager application. The first server grants data network access to the mobile electronic device when a special pass has been provisioned to the first server, wherein the special pass is associated with the mobile electronic device. The second server sends the special pass associated with the mobile electronic device to the first server in response to a triggering event, establishes a data communication session with the mobile electronic device, and sends instructions to the mobile electronic device to remove the electronic wallet application from the mobile electronic device, wherein the establishment of the data communication session is mediated by the authentication, authorization, and accounting application.

In another embodiment, a method of removing an electronic wallet application from a mobile electronic device is disclosed. The method comprises deprovisioning the mobile electronic device from an authentication, authorization, and accounting application. The method also comprises providing a special pass associated with the mobile electronic device to the authentication, authorization, and accounting application. The method also comprises establishing a data session between a trusted service manager and the mobile electronic device based on the special pass. The method also comprises the trusted service manager sending a plurality of instructions via the data session to the mobile electronic device to lock a secure element of the mobile electronic device and to remove the electronic wallet application from the mobile electronic device.

In another embodiment, a method of removing an electronic wallet from a mobile electronic device is disclosed. The method comprises designating the mobile electronic device as one of lost and stolen to an authentication, authorization, and accounting application and deprovisioning the mobile electronic device from the authentication, authorization, and accounting application. When the authentication, authorization, and accounting application receives a data session origination request from the mobile electronic device, the method also comprises the authentication, authorization, and accounting application informing a trusted service manager associated with the mobile electronic device of the data session origination request. The method also comprises the trusted service manager sending a special pass associated with the mobile electronic device to the authentication, authorization, and accounting application. The method also comprises the authentication, authorization, and accounting application establishing a data session between the trusted service manager and the mobile electronic device based on the special pass. The method also comprises the trusted service manager sending a plurality of instructions via the data session to the mobile electronic device to lock a secure element of the mobile electronic device and to remove the electronic wallet application from the mobile electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A mobile electronic device may comprise an electronic wallet that promotes completing electronic payment transactions and other secure transactions. The electronic wallet may include one or more credit cards, one or more debit cards, one or more transit cards, one or more loyalty cards, one or more coupons, one or more secured area access cards, and other secure information. Some of the confidential information, for example account balances and/or account numbers, may be stored in a secure element on the mobile electronic device. The secure element may be a memory and/or processor chip built into the mobile electronic device or it may be a removable module that plugs into the mobile electronic device. The secure element may comprise a secure memory that provides limited access for writing and reading the secure memory. Additionally, the mobile electronic device may include other confidential information, for example lists of personal contacts and/or business contacts, a schedule, a personal calendar, notes, lists of bookmarks to content links and/or universal reference locators to web sites, and other information.

When the mobile electronic device is replaced by a new mobile electronic device, the mobile electronic device will be deprovisioned, for example by removing an electronic serial number (ESN) or media access control identification associated with the mobile electronic device from an authentication, authorization, and accounting (AAA) server. Additionally, the secure and confidential information may be removed from the mobile electronic device to avoid this information being acquired by others. A user of the mobile electronic device may be able to remove some of the confidential information from the mobile electronic device, but this may be inconvenient, complicated, and time consuming. Further, the user of the mobile electronic device may not have the access needed to remove some of the secure information, for example to remove information from the secure element. Specialized instructions that are known, for example, only to a trusted service manager (TSM) server may be needed to remove the secure information from the secure element of the mobile electronic device. To mediate the removal of the secure information from the secure element of the mobile electronic device and/or to remove other information from the mobile electronic device, the trusted service manager server needs to establish a data session and/or a data connection to the mobile electronic device. Establishing a data session after the AAA server has deprovisioned the mobile electronic device, however, ordinarily may be inhibited as a result of the deprovisioning.

The present disclosure teaches a method of providing a special pass to the AAA server associated with the mobile electronic device that authorizes the AAA server to establish a data session and/or a data connection with the mobile electronic device under limited circumstances after the mobile electronic device has been deprovisioned. For example, when the mobile electronic device attempts to establish a data session to the trusted service manager, the subject AAA server attempts to authenticate the mobile electronic device. The AAA server locates the special pass associated with the mobile electronic device and, rather than rejecting the data session as would be expected for the deprovisioned mobile electronic device, the AAA server authorizes the establishment of the data session. In some contexts, the special pass may be referred to as a limited special pass.

In an embodiment, the trusted service manager server may provide the special pass to the AAA server, but in another embodiment some other device may provide the special pass to the AAA server. In an embodiment, the special pass contains an identity of the mobile electronic device, for example an electronic serial number, a media access control identification, and/or another identification associated with the mobile electronic device. In an embodiment, the special pass may identify an expiration time and date of the special pass after which the special pass will not be effective for establishing a communication link. In an embodiment, the special pass may identify a limited number of communications activities that may be conducted based on the special pass and/or a limited number of communication devices to which the mobile electronic device can establish a data connection. For example the special pass may limit data communications to a data connection between the mobile electronic device and the trusted service manager server, and other data connections between the mobile electronic device and other electronic devices may not be authorized. In an embodiment, the trusted service manager server or other device with the proper authorization may update properties associated with the special pass, such as time limited value. In an embodiment, the trusted service manager server or other device may remove the special pass from the AAA server after sensitive information has been removed from the mobile electronic device, for example after an electronic wallet, after address books, after contact information have been removed from the mobile electronic device and after a secure element in the mobile electronic device has been locked.

The special pass may be an entry in a data table or other authentication data structure within or accessible to the AAA server. The special pass may be an otherwise standard entry in an authentication data structure containing a link to a table identifying limitations and conditions associated with the special pass. In an embodiment, the special pass may be stored in local memory of the AAA server.

In an embodiment, the system and method for removing an electronic wallet and other confidential information from a mobile electronic device may be applied to securing a lost or stolen mobile electronic device. A phone that is lost or stolen may be off network for an extended period of time, for example by being turned off or having an exhausted battery. During this time, a user of the mobile electronic device may report the mobile electronic device lost and/or stolen. The trusted service manager server or other network device may notify the AAA server that the mobile electronic device is lost and/or stolen, and the AAA server may deprovision the mobile electronic device and add the equipment serial number of the subject mobile electronic device to a watch list. If the mobile electronic device later attempts to originate a data session and/or data connection, the AAA server reports this to the trusted service manager server, the trusted service manager server may send the special pass to the AAA server, the trusted service manager server may establish a data connection with the mobile electronic device, and the trusted service manager server may remove the electronic wallet and other confidential information from the mobile electronic device.

Figure 1:
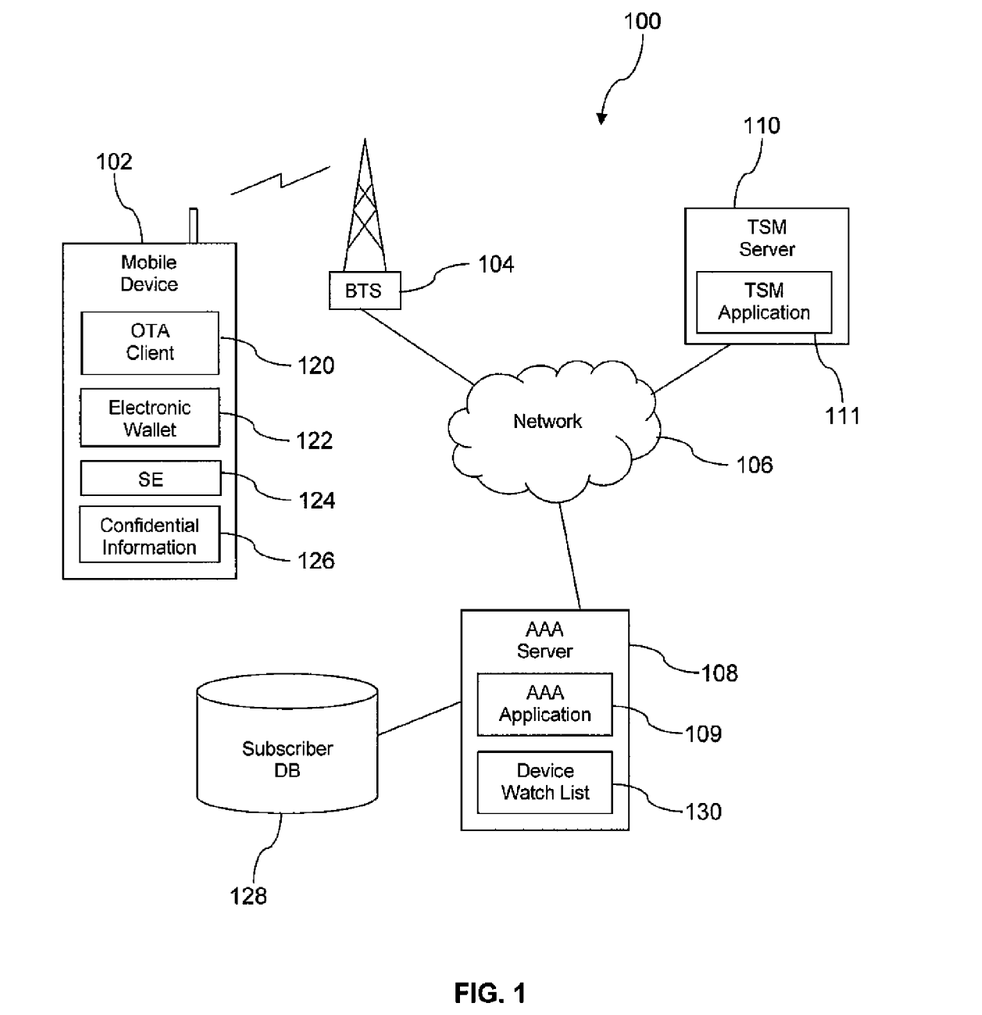
FIG. 1 is an illustration of a communication system according to an embodiment of the disclosure.

Turning now to FIG. 1, a system 100 for electronic wallet removal from mobile electronic devices is discussed. The system comprises a mobile electronic device 102, a base transceiver station 104, a communication network 106, an AAA server 108, and a trusted service manager server 110. In an embodiment, the mobile electronic device 102 comprises an over-the-air client 120, an electronic wallet 122, a secure element 124, and confidential information 126. While a single mobile electronic device 102 is depicted in FIG. 1, it is understood that many more mobile electronic devices 102 may be part of the system 100. Similarly, while only one base transceiver station 104 is depicted in FIG. 1, it is understood that the system 100 includes many additional base transceiver stations 104. The system 100, further, may comprise any number of AAA servers 108 and trusted service manager servers 110.

The mobile electronic device 102 may communicate with other devices through a wireless link provided by the base transceiver station 104 using code division multiple access (CDMA), global system for mobile communications (GSM), worldwide interoperability for microwave access (WiMAX), and/or other public land mobile network (PLMN) communications protocols, technologies, and/or techniques. The base transceiver station 104 may communicate with the network 106 through either of wired or wireless links. The AAA server 108 and the trusted service manager server 110 are similarly coupled to the network 106 and are able to communicate with each other and the mobile electronic device 102 via the network 106.

The AAA server 108 and the trusted service manager server 110 may be implemented as computer systems. Computers and computer systems are discussed in more detail hereinafter. The AAA server 108 and the trusted service manager server 110 may be managed and controlled by a common carrier operating company to provide communication services to subscribers. In some contexts it may be said that the functionality of the AAA server 108 is provided by an authentication, authorization, and accounting application 109. In some contexts, the authentication, authorization, and accounting application 109 taught by the present disclosure may be said to include an intelligent session control mechanism. In some contexts it may be said that the functionality of the trusted service manager server 110 is provided by a trusted service manager application 111. The trusted service manager server 110 may manage the secure element 124 lifecycle and be hosted in a secure domain of the operating company. In another embodiment, however, the trusted service manager server 110 may be operated by a third party under contract with the operating company.

The mobile electronic device 102 may be any of a mobile phone, a personal digital assistant (PDA), a laptop computer, a tablet computer, a media player, and other electronic communication devices that are portable. An embodiment of a mobile electronic device 102 is discussed in more detail hereinafter.

When the mobile electronic device 102 is deprovisioned, for example when the mobile electronic device 102 is removed from a subscriber communication services account when replacing with a different mobile electronic device, the identity of the mobile electronic device 102 may be removed from a list of subscriber mobile electronic devices accessible to the AAA server 108, for example from a subscriber database 128. As part of the process of replacing the mobile electronic device 102 on the subscriber account, the operating company may port some information from the mobile electronic device 102 to the replacement mobile electronic device, for example address book information, personal and/or business contact information, calendar information, and other information. Additionally, the operating company may remove the electronic wallet 122 and other information from the mobile electronic device 102. The operating company may also lock the secure element 124. In some contexts these procedures may be referred to as cleaning up the mobile electronic device 102. Cleaning up the mobile electronic device 102 may be performed by the trusted service manager server 110 communicating with the over-the-air client 120 of the mobile electronic device 102.

To enable establishing a data session between the mobile electronic device 102 and the trusted service manager server 110, the trusted service manager server 110 may send a special pass identifying the mobile electronic device 102 to the AAA server 108. The AAA server 108 may store the special pass in the subscriber database 128. The trusted service manager server 110 may then originate a data session with the mobile electronic device 102, and the AAA server 108 may authorize the data session with the mobile electronic device 102 based on looking up the special pass associated with the mobile electronic device 102 in the subscriber database 128. The AAA application 109 may not authorize a data session between a different originating communication terminal and the mobile electronic device 102 based on the special pass. Additionally, the AAA application 109 may not authorize a data session between the mobile electronic device 102 and any other terminal, including the trusted service manager server 110, after a time defined in the special pass has expired.

When the data session is established between the trusted service manager server 110 and the mobile electronic device 102, the trusted service manager server 110 may first retrieve information from the mobile electronic device 102, for example contacts information, schedule and/or calendar information, and account balance information for copying over to a replacement mobile electronic device. The trusted service manager server 110 may then delete information from the mobile electronic device 102. The trusted service manager server 110 may remove confidential information 126 from the mobile electronic device 102, for example deleting personal contacts and/or business contacts, schedule information, calendar information, email messages, address book information, credit card information, debit card information, loyalty card information, coupon information, secure facility access codes, bookmarks for links to content, notes, and other information. Secure facility access codes may be electronic building access codes, electronic room access codes, electronic parking lot access codes, and/or electronic codes for accessing locked boxes and/or other locked areas. The trusted service manager server 110 may remove an electronic wallet 122 from the mobile electronic device 102, for example deleting an electronic wallet application and/or program from the mobile electronic device 102. The trusted service manager server 110 may lock a secure element 124 of the mobile electronic device 102.

After the trusted service manager server 110 has cleaned up the mobile electronic device 102, the trusted service manager server 110 may delete the special pass from the AAA server 108. Alternatively, if the special pass contains a time limit defined, the trusted service manager server 110 may not delete the special pass from the AAA server 108.

In an embodiment, when the mobile electronic device 102 is reported as lost or stolen, a notification may be sent to the AAA server 108. The AAA server 108 may add the mobile electronic device 102 to a device watch list 130, for example adding an identification of the mobile electronic device 102, such as the electronic serial number or other identifying information, to the device watch list 130. A lost or stolen mobile electronic device 102 may be deprovisioned, at least temporarily, by the operating company by removing the mobile electronic device 102 from the subscriber database 128. If the mobile electronic device 102 attempts to originate a data session, the AAA server 108 will determine that the mobile electronic device 102 is not provisioned for making a data session. The AAA server 108 may then consult the device watch list 130. When the AAA server 108 determines that the mobile electronic device 102 is identified on the device watch list 130, the AAA server 108 may send a notification to the trusted service manager server 110. The trusted service manager 110 may then send a special pass to the AAA server 108 identifying the mobile electronic device 102. The trusted service manager server 110 may then establish a data session with the mobile electronic device 102 and remove information from the mobile electronic device 102 as described above, thereby thwarting potential identity theft and securing the mobile electronic device 102.

Figure 2:
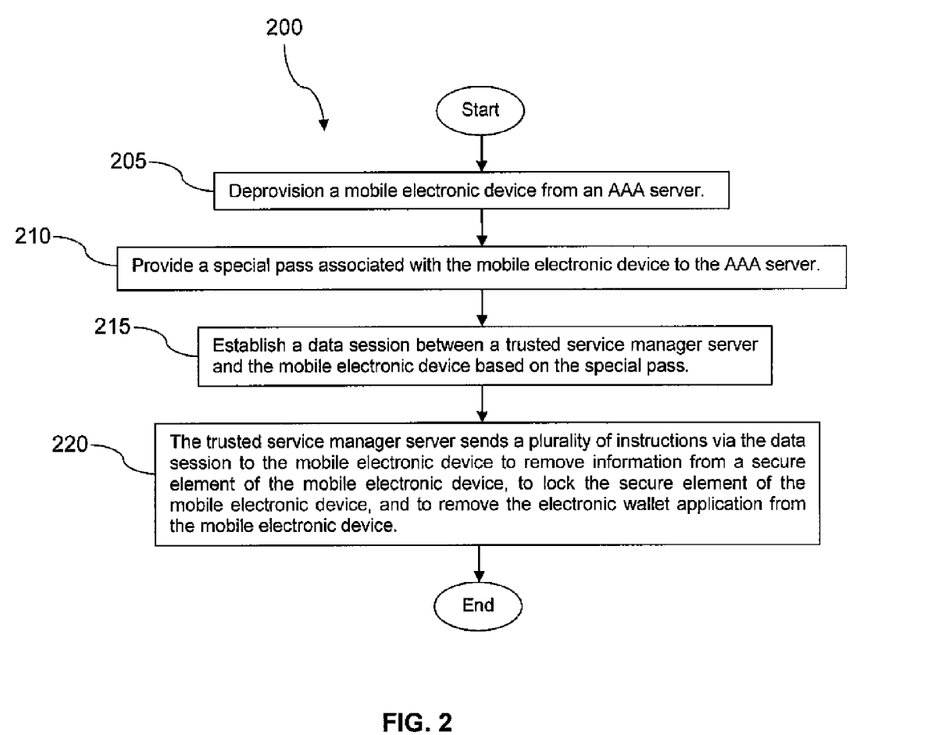
FIG. 2 is a flow chart of a method according to an embodiment of the disclosure.

Turning now to FIG. 2, a method 200 is described. At block 205, the mobile electronic device 102 is deprovisioned from the AAA server 108. In an embodiment, the mobile electronic device 102 may be deprovisioned by deleting an entry identifying the mobile electronic device 102 in the subscriber database 128. In another embodiment, the mobile electronic device 102 may be deprovisioned in a different manner, for example by setting an invalid flag or some other state indication of having been deprovisioned in an entry associated with the mobile electronic device 102. At block 210, a special pass associated with the mobile electronic device 102 is provided to the AAA server 108. For example, the trusted service manager server 110 or another device in the operating company network may send the special pass during a deprovisioning procedure being conducted in association with the mobile electronic device 102. The special pass may identify the mobile electronic device 102, the communication services that may be provided to the mobile electronic device 102, and a time during which the special pass may be valid.

At block 215, the trusted service manager server 110 establishes a data session with the mobile electronic device 102. In an embodiment, the AAA server 108 authorizes the establishment of the data session based on the special pass that was provided at block 210. In an embodiment, if the trusted service manager server 110 attempts to establish the data session with the mobile electronic device 102 after the expiration of a time limit defined in the special pass, the AAA server 108 rejects the attempt to establish the data session. In an embodiment, if some device other than the trusted service manager server 110 attempts to establish a data session with the mobile electronic device 102, the AAA server 108 rejects the attempt to establish the data session.

At block 220, the trusted service manager server 110 sends a plurality of instructions via the data session to the mobile electronic device 102, for example to the over-the-air client 120 on the mobile electronic device 102, to remove information from the mobile electronic device, to lock the secure element 124, and to remove the electronic wallet 122 from the mobile electronic device 102. The over-the-air client 120 may execute some of the instructions and may distribute others of the instructions to other components of the mobile electronic device 102 for execution by those components, for example distributing instructions to the secure element 124 for execution on the secure element 124. In an embodiment, the mobile electronic device 102 may send confirmation to the trusted service manager server 110 that the secure element 124 has been locked, that the electronic wallet 122 has been removed and/or deleted, and that confidential information 126 has been removed from the mobile electronic device 102.

Figure 3:
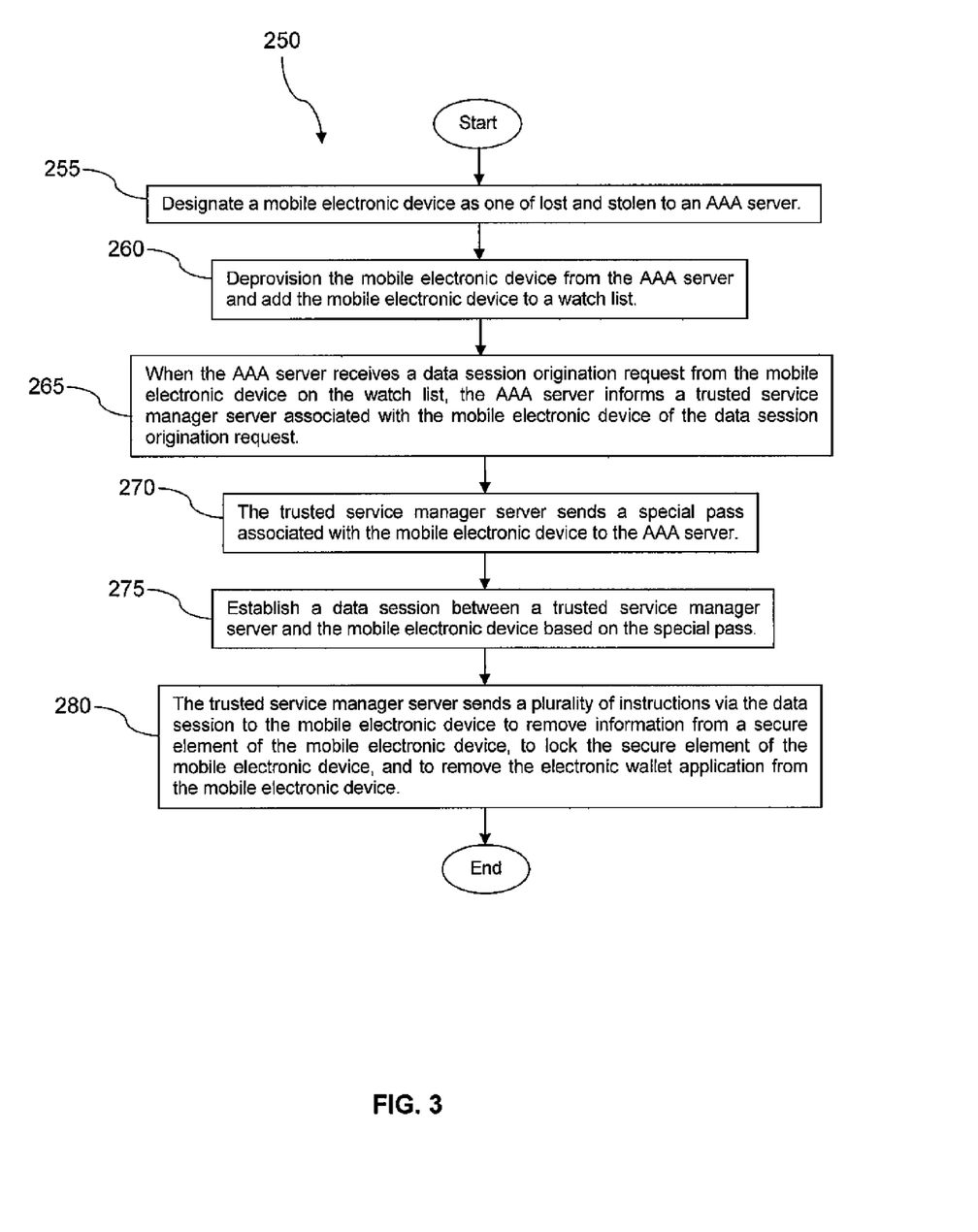
FIG. 3 is a flow chart of another method according to an embodiment of the disclosure.

Turning now to FIG. 3, a method 250 is described. At block 255, the mobile electronic device 102 is designated as one of lost and stolen to the AAA server 108. A user of the mobile electronic device 102 may determine that the mobile electronic device 102 is either lost or stolen and phone this information in to a customer care center associated with the operating company, and the operating company may notify the AAA server 108. At block 260, the mobile electronic device 102 is deprovisioned from the AAA server 108 in a manner similar to that described above with reference to block 205 of FIG. 2. In an embodiment, the AAA server 108 may add the mobile electronic device 102 to the device watch list 130. At block 265, when the AAA server 108 receives a request to establish or originate a data session from the mobile electronic device 102, the AAA server 108 notifies and/or informs the trusted service manager server 110 of the data session origination request. In an embodiment, the AAA server 108 may check the request to establish the data session from the mobile electronic device 102 against the device watch list 130.

At block 270, the trusted service manager server 110 sends a special pass associated with the mobile electronic device 102 to the AAA server 108 in a manner similar to that described above with reference to block 210 of FIG. 2. At block 275, a data session is established between the mobile electronic device 102 and the trusted service manager server 110 based on the special pass. At block 280, the trusted service manager server 110 sends instructions to the mobile electronic device 102, for example to the over-the-air client 120 on the mobile electronic device 102, to clean-up the mobile electronic device 102 in a manner similar to that described above with reference to block 220 in FIG. 2.

Figure 4:
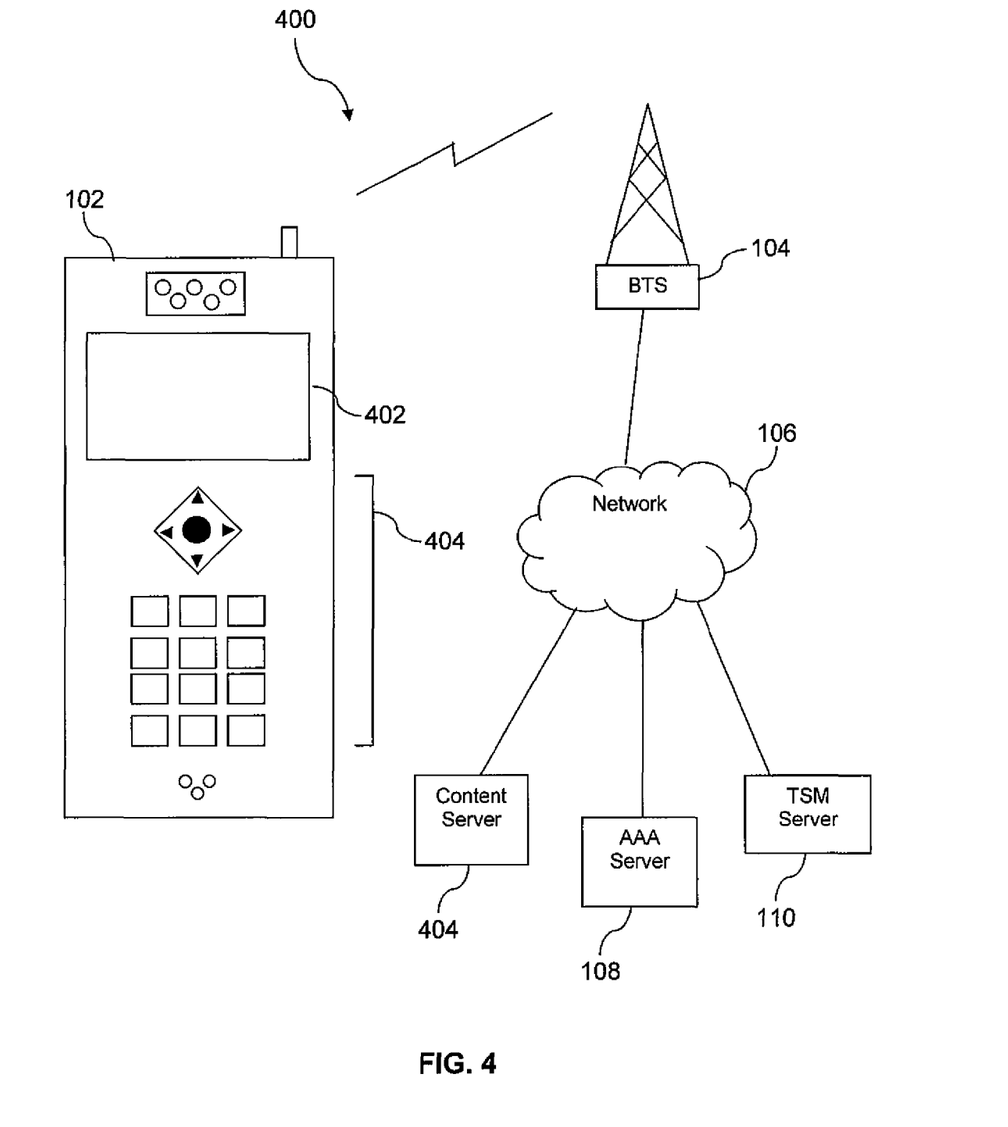
FIG. 4 is an illustration of a handset according to an embodiment of the disclosure.

FIG. 4 shows a wireless communications system 400 including the mobile electronic device 102. FIG. 4 depicts the mobile electronic device 102, which is operable for implementing aspects of the present disclosure, but the present disclosure should not be limited to these implementations. Though illustrated as a mobile phone, the mobile electronic device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile electronic device 102 may be a special-purpose communications device such as a mobile phone, wireless handset, pager, or PDA. The mobile electronic device 102 may support specialized activities such as gaming, inventory control, job control, and/or task management functions, and so on.

The mobile electronic device 102 includes a display 402 and a touch-sensitive surface or keys 404 for input by a user. The mobile electronic device 102 may present options for the user to select, controls for the user to actuate, and/or cursors or other indicators for the user to direct. The mobile electronic device 102 may further accept data entry from the user, including numbers to dial or various parameter values for configuring the operation of the handset. The mobile electronic device 102 may further execute one or more software or firmware applications in response to user commands. These applications may configure the mobile electronic device 102 to perform various customized functions in response to user interaction. Additionally, the mobile electronic device 102 may be programmed and/or configured over-the-air, for example from a wireless base station, a wireless access point, or a peer mobile electronic device 102.

The mobile electronic device 102 may execute a web browser application which enables the display 402 to show a web page. The web page may be obtained via wireless communications with the base transceiver station 104, a wireless network access node, a peer mobile electronic device 102 or any other wireless communication network or system. While a single base transceiver station 104 is illustrated, it is understood that the wireless communication system may comprise additional base transceiver stations. In some instances, the mobile electronic device 102 may be in communication with multiple base transceiver stations 104 at the same time. The base transceiver station 104 (or wireless network access node) is coupled to a wired network 106, such as the Internet. Via the wireless link and the wired network, the mobile electronic device 102 has access to information on various servers, such as a content server 404, the AAA server 108, and the TSM server 110. The content server 404 may provide content that may be shown on the display 402. Alternately, the mobile electronic device 102 may access the base transceiver station 104 through a peer mobile electronic device 102 acting as an intermediary, in a relay type or hop type of connection.

Figure 5:
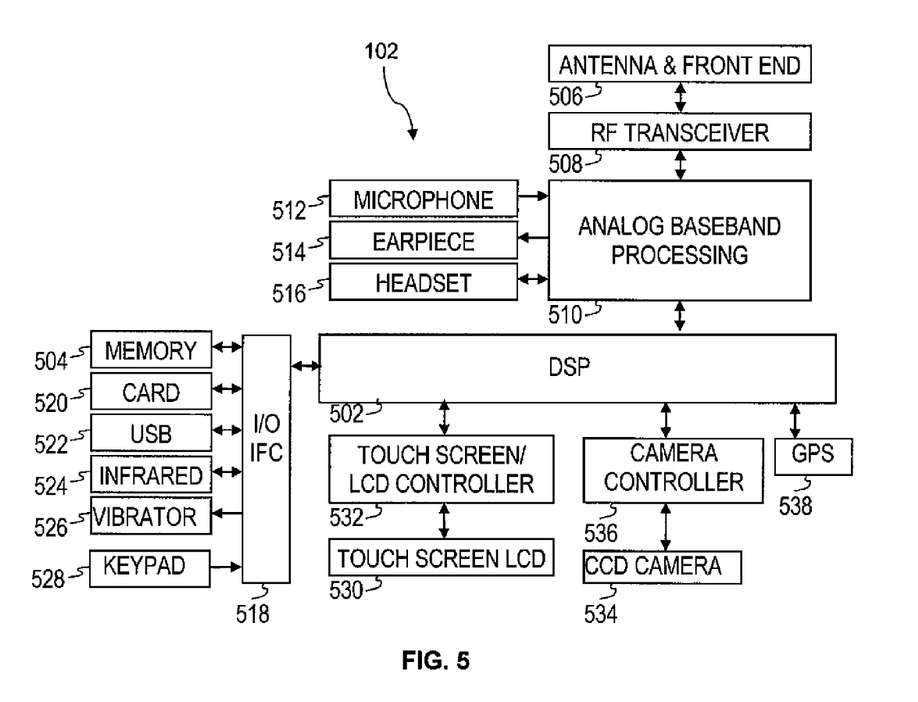
FIG. 5 is a block diagram of a handset according to an embodiment of the disclosure.

FIG. 5 shows a block diagram of the mobile electronic device 102. While a variety of known components of handsets 102 are depicted, in an embodiment a subset of the listed components and/or additional components not listed may be included in the mobile electronic device 102. The mobile electronic device 102 includes a digital signal processor (DSP) 502 and a memory 504. As shown, the mobile electronic device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile electronic device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile electronic device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile electronic device 102 to send and receive information from a radio access network (RAN) or some other available wireless communications network or from a peer mobile electronic device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile electronic device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile electronic device 102 to function as a peripheral device to exchange information with a personal computer or other computer system. The infrared port 524 and other optional ports such as a Bluetooth interface or an IEEE 802.11 compliant wireless interface may enable the mobile electronic device 102 to communicate wirelessly with other nearby handsets and/or wireless base stations.

The input/output interface 518 may further connect the DSP 502 to the vibrator 526 that, when triggered, causes the mobile electronic device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile electronic device 102. Another input mechanism may be the touch screen LCD 530, which may also display text and/or graphics to the user. The touch screen LCD controller 532 couples the DSP 502 to the touch screen LCD 530.

The CCD camera 534 enables the mobile electronic device 102 to take digital pictures. The DSP 502 communicates with the CCD camera 534 via the camera controller 536. The GPS sensor 538 is coupled to the DSP 502 to decode global positioning system signals, thereby enabling the mobile electronic device 102 to determine its position. In another embodiment, a camera operating according to a technology other than charge coupled device cameras may be employed. Various other peripherals may also be included to provide additional functions, e.g., radio and television reception.

Figure 6:
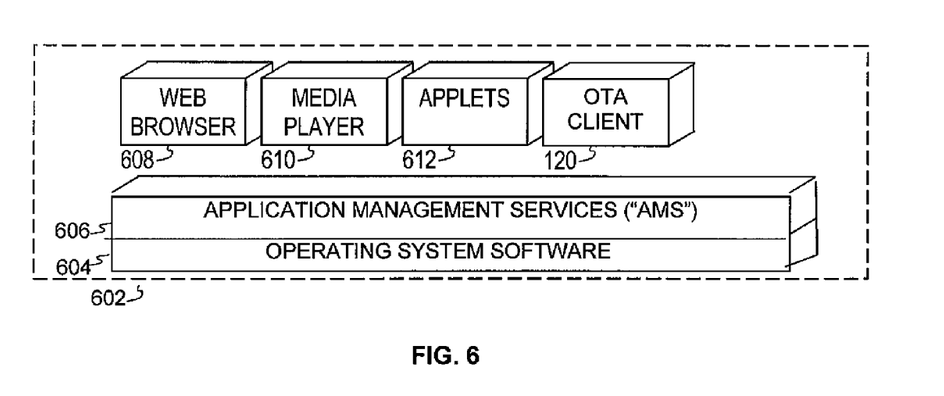
FIG. 6 is a block diagram of a software architecture of a handset according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile electronic device 102. Also shown in FIG. 6 are a web browser application 608, a media player application 610, JAVA applets 612, and the over-the-air client 120. The web browser application 608 configures the mobile electronic device 102 to operate as a web browser, allowing a user to enter information into forms and select links to retrieve and view web pages. The media player application 610 configures the mobile electronic device 102 to retrieve and play audio or audiovisual media. The JAVA applets 612 configure the mobile electronic device 102 to provide games, utilities, and other functionality. The over-the-air client 120 was discussed above with reference to FIG. 1.

Figure 7:
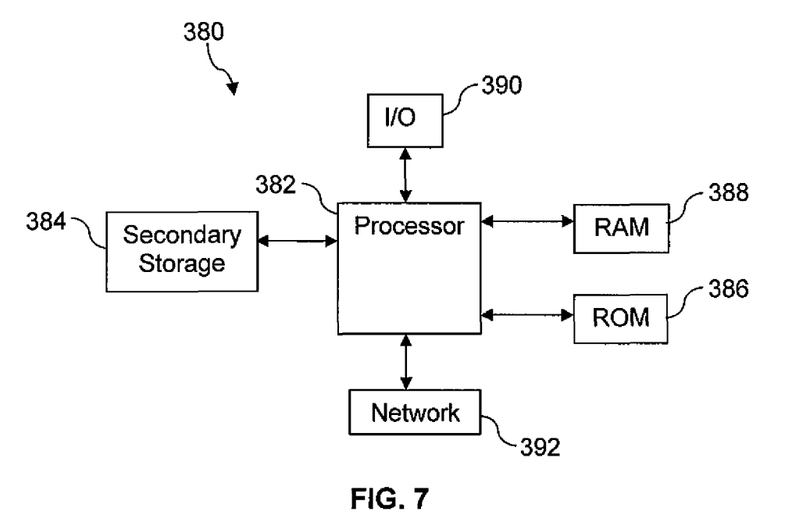
FIG. 7 illustrates an exemplary computer system suitable for implementing the some aspects of an embodiment of the disclosure.

Some aspects of the system described above may be implemented on a computer with sufficient processing power, memory resources, and network throughput capability to handle the necessary workload placed upon it. FIG. 7 illustrates a typical computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of removing an electronic wallet application from a mobile electronic device, comprising:
designating the mobile electronic device as one of lost and stolen to an authentication, authorization, and accounting ("AAA") application;
in response to the designating, deprovisioning the mobile electronic device from the AAA application, wherein the deprovisioning comprises removing an identifier associated with the mobile electronic device from a subscriber list to inhibit establishment of data sessions between a trusted service manager and the mobile electronic device;
storing the identifier removed from the subscriber list on a watch list;
subsequent to the deprovisioning, receiving, by the AAA application, a data session origination request from the mobile electronic device;
in response to receiving the data session origination request from the mobile electronic device, determining, by the AAA application, that an identifier provided with the data session origination request matches the identifier stored on the watch list;
in response to determining that the identifier provided with the data session origination request matches the identifier stored on the watch list, informing the trusted service manager of such match determination;
in response to being informed of such match determination, providing, by the trusted service manager, a special pass associated with the mobile electronic device to the AAA application;
establishing a limited data session between the trusted service manager and the mobile electronic device based on the special pass;
sending, by the trusted service manager, a plurality of instructions via the limited data session to the mobile electronic device to lock a secure element of the mobile electronic device and to remove the electronic wallet application from the mobile electronic device; and
receiving, by the trusted service manager from the mobile electronic device, a confirmation that the secure element has been locked and the electronic wallet application has been removed.

2. The method of claim 1, wherein the deprovisioning the mobile electronic device comprises removing at least one of an electronic serial number (ESN) associated with the mobile electronic device and a media access control identification associated with the mobile electronic device from a subscriber list database associated with the AAA application.

3. The method of claim 1, wherein at least some of the instructions execute on the secure element of the mobile electronic device.

4. The method of claim 1, further including deleting the special pass associated with the mobile electronic device from the AAA application after the confirmation is transmitted.

5. The method of claim 1, wherein the instructions sent via the limited data session further remove confidential information from the mobile electronic device.

6. The method of claim 1, wherein the mobile electronic device communicates with the trusted service manager at least in part using a public land mobile network.

7. The method of claim 5, wherein the confidential information comprises at least one of personal contact information, business contact information, bookmarks for content links, schedule data, and notes.

8. The method of claim 1, wherein the mobile electronic device is one of a mobile phone, a personal digital assistant, a media player, a laptop computer, and a tablet computer.

9. The method of claim 1, further comprising the AAA application checking whether a time limit associated with the special pass has expired prior to establishing the limited data session.

* * * * *